United States Patent [19]

Ostermann et al.

[11] 4,205,649
[45] Jun. 3, 1980

[54] LIGHT-METAL PISTON

[75] Inventors: Albrecht Ostermann, Schorndorf; Manfred Röhrle, Nellingen; Klaus Welker, Stuttgart, all of Fed. Rep. of Germany

[73] Assignee: Mahle GmbH, Stuttgart, Fed. Rep. of Germany

[21] Appl. No.: 803,962

[22] Filed: Jun. 6, 1977

[30] Foreign Application Priority Data

Jun. 11, 1976 [DE] Fed. Rep. of Germany ....... 2626131

[51] Int. Cl.$^2$ ............................................. B23P 15/10
[52] U.S. Cl. ......................... 123/193 P; 123/193 CP; 29/156.4 WL; 92/223; 92/224
[58] Field of Search ................. 123/193 P, 193 CP; 29/156.4 WL, 156.5 R; 92/223, 224; 91/169; 148/6.27; 204/33, 35 N

[56] References Cited

U.S. PATENT DOCUMENTS

| 2,845,917 | 8/1958 | Laubender | 123/193 P |
| 3,149,409 | 9/1964 | Maruhn | 123/193 P |
| 3,807,014 | 4/1974 | Hummel | 123/193 P |

FOREIGN PATENT DOCUMENTS 491974 9/1938 United Kingdom ................. 123/193 P
803357 10/1958 United Kingdom .

*Primary Examiner*—Ronald H. Lazarus
*Attorney, Agent, or Firm*—Murray and Whisenhunt

[57] ABSTRACT

A light-metal piston with parts hard-eloxated to increase their resistance to heat and mechanically reinforced to the depth of the hard eloxation.

1 Claim, No Drawings

LIGHT-METAL PISTON

BACKGROUND OF THE INVENTION

1. Field of the Invention

This invention relates to a light-metal piston for combustion engines, with certain points on the surface subjected to high temperatures, particularly on the piston head, where these parts are hard-eloxated in order to increase their resistance to heat.

2. Description of the Prior Art

It has already long been customary to improve the heat resistance of those surfaces of light-metal pistons which are locally subjected to high temperatures by electrolytically oxidizing them. This applies above all to the piston head, particularly when it is provided with a combustion cavity.

The fact is that in pistons for combustion engines subjected to high thermal strains there is a danger of the formation of cracks. These are mainly caused by local excessive temperatures accompanied by high mechanical strains due to gas forces. The crack formation mechanism manifests itself most distinctly at the edge of a combustion cavity in a piston head.

The edge of a combustion cavity is subjected to the following main loads:

(a) extreme temperature acting locally on the edge;
(b) high gas forces;
(c) intermittent changes, of high frequency, in the temperatures and gas forces.

The cracks occurring under these loads take a radial course over the edge of the cavity and occur with practically all customary aluminium piston alloys.

The combustion cavity situated in the piston head is subjected to temperatures which rise from the outer periphery of the piston head towards the edge of the cavity and which decrease from the latter towards the base of the cavity. Under these temperature conditions that zone of the piston head which undergoes the greatest temperature increase, i.e. the edge of the combustion cavity, is prevented, by the colder zones of material surrounding the edge of the cavity on all sides, from undergoing the amount of free expansion which would correspond to the thermal expansion coefficient of the material present and the temperature prevailing at that point. Considerable compressive stresses thus build up in the fully heated edge of the cavity. These compressive stresses cause plastic deformation of the light metal, of which the heat resistance is to this extent insufficient, in the zone of the edge of the cavity. The temperature peaks occurring in the said zone are frequently above 350° C. As the strength of aluminium piston alloys usually suffers a considerably reduction at temperatures from 250° onwards, such temperature peaks rapidly cause the elastic limit to be exceeded. The upsetting of the edge zone material, which occurs in the plastic deformation accompanying peak temperatures, causes tensile stresses to occur in that position when the cooling takes place. These tensile stresses, in their turn, are the cause of the radial cracks in the edge zone of the combustion cavity. In order to avoid such cracks these zones are subjected, inter alia, to the electrolytic oxidation process. The effect of a so-called hard eloxation coating of this kind may be explained as follows:

Compressive stresses build up in the zone of the hard eloxation layer. The hard eloxation layer itself, moreover, is still very largely resistant to extremely high temperatures, thanks to its mainly ceramic properties. To this extent the hard eloxation coating itself will even stand up to peak temperatures amounting, for example to over 350° C. In addition, the coating has an important function to perform with regard to the non-oxidized aluminium material situated underneath it. For owing to the necessary equilibration of forces the compression stresses of the hard eloxation coating cause corresponding tensile stresses in the adjacent basic aluminium material.

These tensile stresses now act in opposition to the compressive stresses which are caused by the prevention of expansion and which start from the edge of the cavity and which cause the plastic deformation of the aluminium material, i.e. the said tensile stresses first of all have to be reduced before any tensile stress state can be obtained in that position. The result is that the maximum compressive stress level in the basic aluminium zone adjacent to the hard eloxation layer is reduced by the amount of the tensile stresses automatically introduced at that point in advance. For the oxide layer itself a high compressive stress is harmless, since owing to its ceramic properties such stresses cannot lead to any plastic deformation, even at the upper limit of the maximum temperatures occurring in these cases. In other words, the oxide layer itself is sufficiently resistant under all operating conditions.

Hard eloxation layers are particularly effective on the edges of combustion cavities. For the aforementioned compressive stresses undergo a particularly distinct reduction in the zone of the internal radii of the endangered edges. This likewise applies to flat piston heads, where the compressive stresses in the hard eloxation layer, however, have been reduced to the extent of the compressive stresses taking place for geometrical reasons on internal radii.

SUMMARY OF THE INVENTION

The purpose of the invention is to increase still further the tensile stresses proceeding from a hard eloxation layer to the adjacent basic light metal.

This purpose is achieved as a result of the fact that the hard eloxated portions of the surface are also reinforced mechanically, this being limited to the depth to which the hard eloxation extends.

The purpose of the mechanical reinforcement covered by the invention is to enable the compressive stresses in the hard eloxation layer to be increased still further. It is a particular purpose of the invention to coordinate the zones of mechanical reinforcement and of the hard eloxation with each other, from the point of view of depth, in such a way that the compressive stresses proceeding from the mechanical reinforcement will be caused, at the point at which the compressive stresses of the hard eloxation are introduced into the basic material, to coincide completely with these latter. For only in this manner can the tensile stresses of the basic material increase accordingly and the danger of plastic deformation by locally excessive thermal expansion be avoided. The compressed zone, however, must on no acccount extend to a greater depth than the eloxation layer, since compressive stresses would then be introduced into the basic material which is not oxidized and in which cracks are therefore likely to form as a result of inadequate thermal resistance, and these stresses would then not only fail to prevent the formation of cracks but would even render it still more probable.

The compression can be carried out by known processes, such as rolling, hammering, the pressure jet method etc., and this can be done either before or after the eloxation. The compression results in approximately a three-fold to five-fold increase in the compressive stresses caused by the hard eloxation. In a piston head constructed in accordance with the invention it has been found that the resistance to the formation of cracks can be multiplied considerably by comparison with piston heads which have been hard eloxated.

The hard eloxation layer should be about 40 to 150 $\mu$m and preferably 70 to 110 $\mu$m thick. It should be borne in mind that the conversion of aluminium into $Al_2O_3$ (hard eloxal) increases the volume of the eloxated basic material by the factor 2 and thus increases the size of the workpiece by one half of the thickness of the hard eloxation layer.

As regards existing prior art it should be pointed out at this juncture that a compression of places to be hard eloxated on aluminium pistons is already known from British Pat. No. 803,357, although for a different purpose from that to which the present invention relates. In the British Patent mentioned the problem is to enable aluminium alloys with a higher copper and silicon content to be oxidized electrolytically. According to the details given in the said document, however, such alloys cannot be immediately eloxated without any difficulty. On the contrary, the surfaces to be oxidized first of all have to be corroded and then smoothed mechanically, e.g. by rolling. As a general principle the only purpose of the mechanical smoothing process is to eliminate the pores produced or the roughening caused in the surface by the corrosion operation and also to provide, for the subsequent eloxation, a free surface in connection with the corrosion of copper and silicon. The said document, on the other hand, contains no reference to the teaching provided by the present invention, for the avoidance of cracks caused by heat, by superimposing the compressive stresses of an oxide layer in a planned manner on the additional compressive stresses introduced into this eloxal layer by mechanical reinforcement, in order to produce the maximum possible tensile stresses in the zone of transition to the basic material adjacent to the said layer.

DESCRIPTION OF A PREFERRED EMBODIMENT

An example of the invention is described below.

In a light metal piston made of the alloy AlSi 12 CuMgNi the piston head having a combustion cavity is completely hard-eloxated. The hard eloxal layer has a thickness of 80 to 100 $\mu$m. In the zone of the edge of the cavity the piston head has been compressed, prior to the eloxation, to a depth of about 40 $\mu$m perpendicularly to the surface, i.e. in the exact zone which has been converted from the basic material into hard eloxal, as the hard eloxal layer, of course, causes the volume and thus the layer thickness likewise to be doubled. The compression itself is performed with the pressure jet process, using glass beads of an average diameter of 100 $\mu$m, at a pressure of 6.8 atmg. A piston head constructed on these lines has been found in practice to be considerably more resistant to cracks than a hard-eloxated piston head. With corresponding tests, however, it has also been found that a mechanically produced compression zone, going beyond the depth of the hard eloxal layer, increases the likelihood of the formation of cracks.

The compression operation according to the invention is fundamentally applicable both to surfaces which have been machined with the removal of material prior to the eloxation and those in which the surface to be eloxated consists of a casting skin. In the latter case the desired effect is surprisingly satisfactory, so that the teaching covered by the invention is particularly suitable for this purpose. In this connection it is important, first and foremost, that the compressed zone should not extend beyond the hard eloxation zone, since this would worsen rather than improve the resistance of the material.

We claim:

1. A light metal piston for a combustion engine, said piston having a combustion cavity including an edge, only said edge being eloxated to provide a coating of eloxated material in the zone at and adjacent to said edge, and only that zone of the piston being subsequently compressed after eloxation in such a manner that the depth of the compressed effect is approximately the same as the depth of the eloxated material, this depth being between 40 and 150 $\mu$m.

* * * * *